April 17, 1956  C. T. McGILL  2,742,421
WATER CONDITIONING APPARATUS
Filed May 17, 1950  5 Sheets-Sheet 1
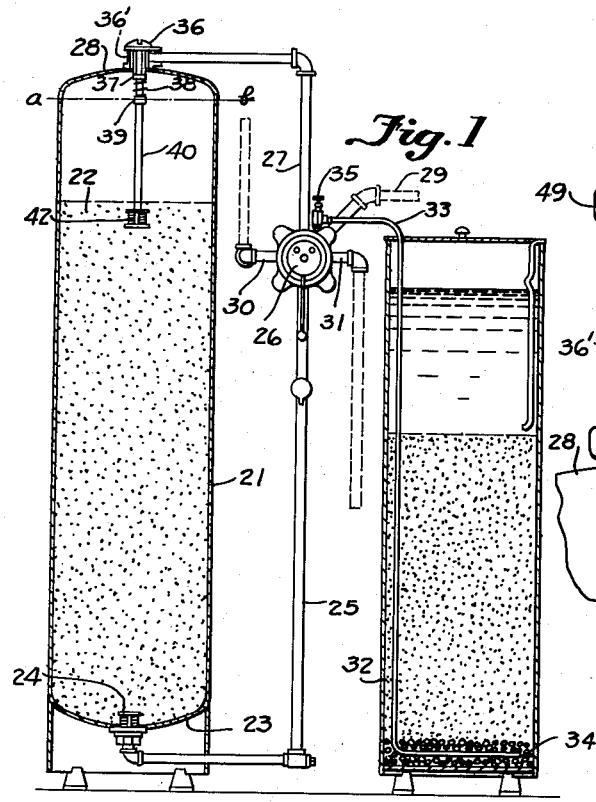
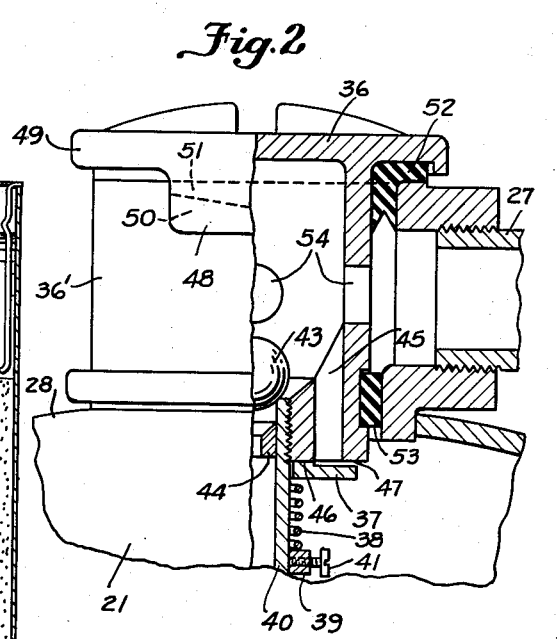
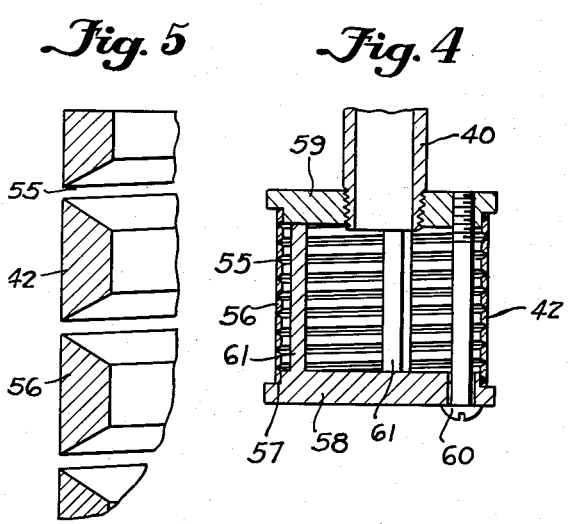
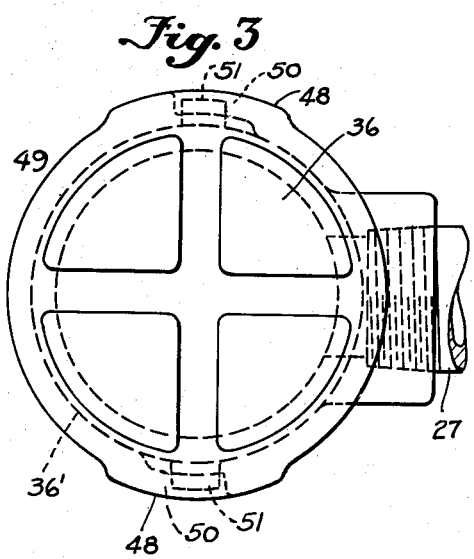
Inventor
Chester T. McGill
Andrew F. Wintercorn
Atty.

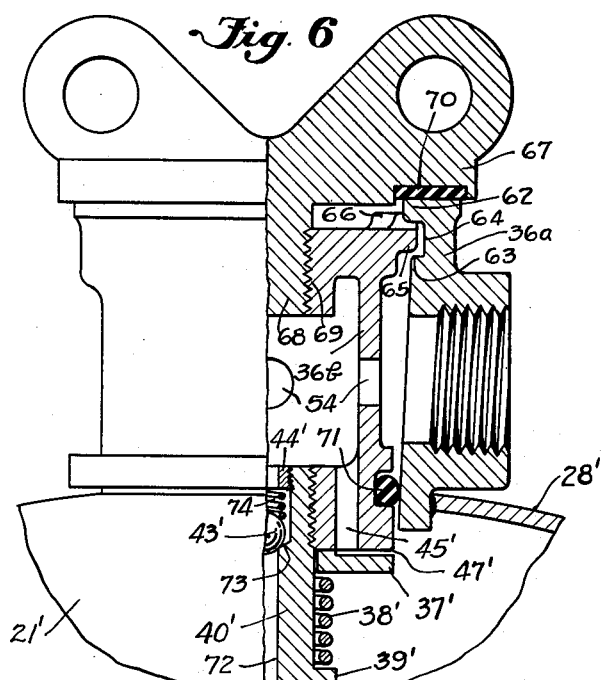
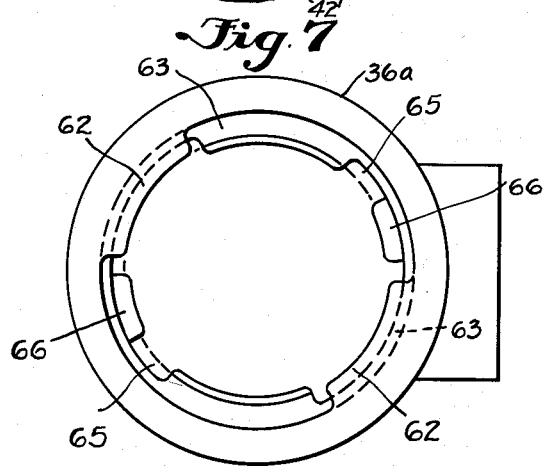
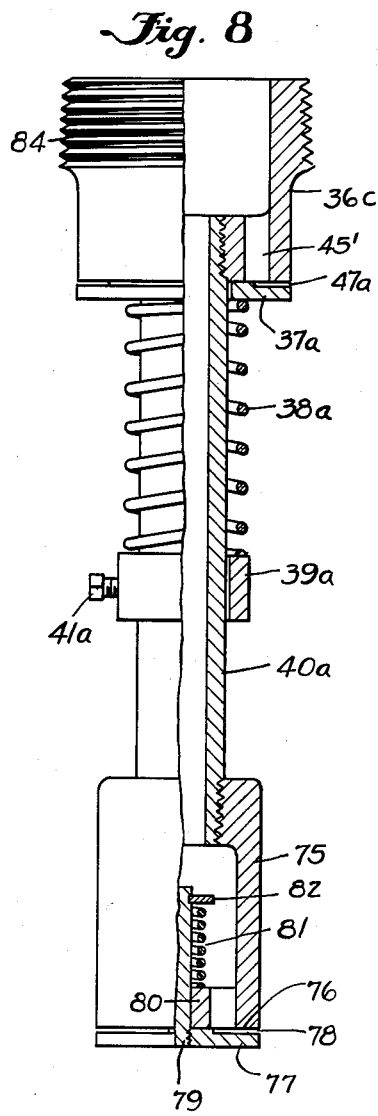
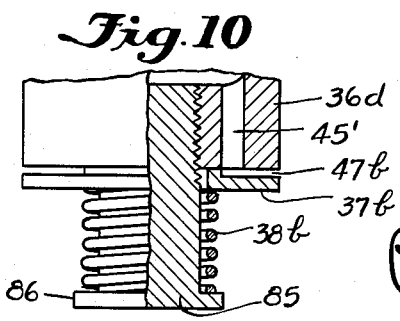

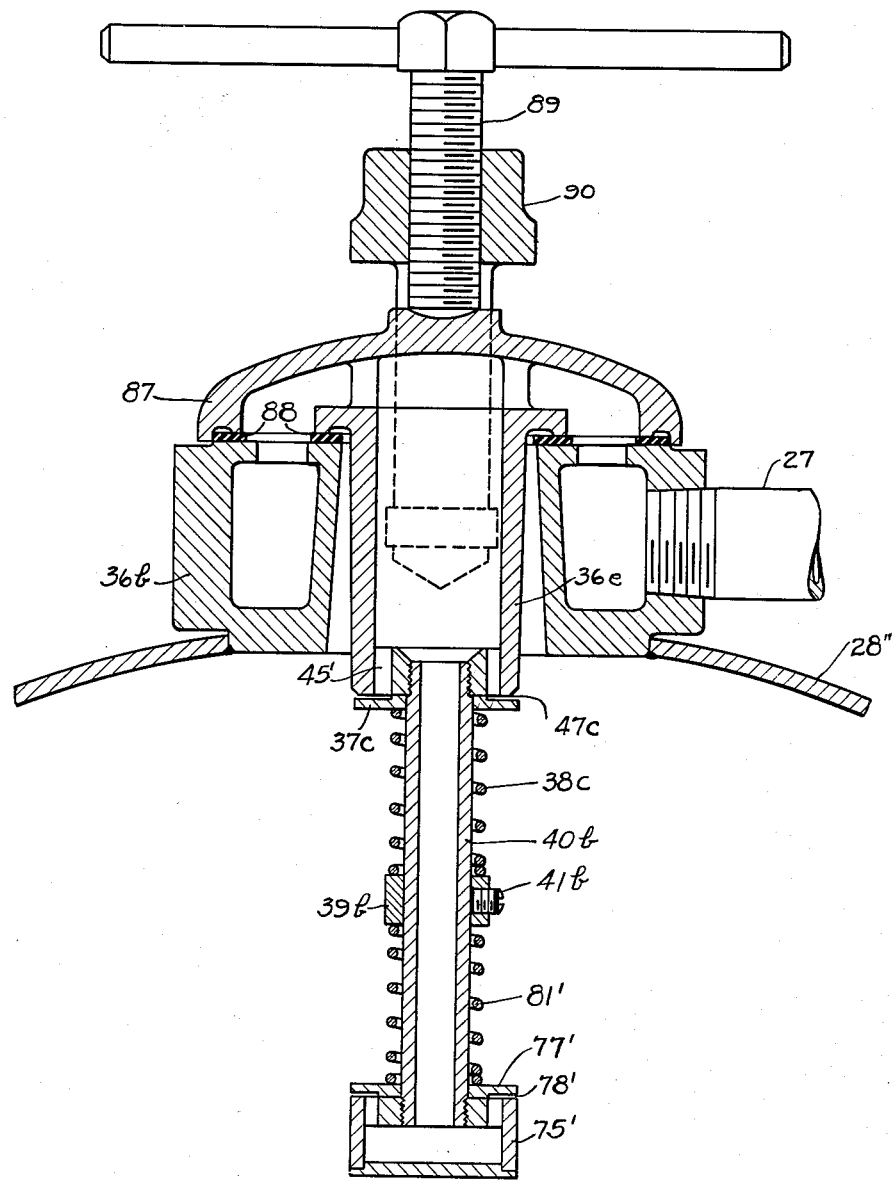

April 17, 1956 C. T. McGILL 2,742,421
WATER CONDITIONING APPARATUS
Filed May 17, 1950 5 Sheets-Sheet 4
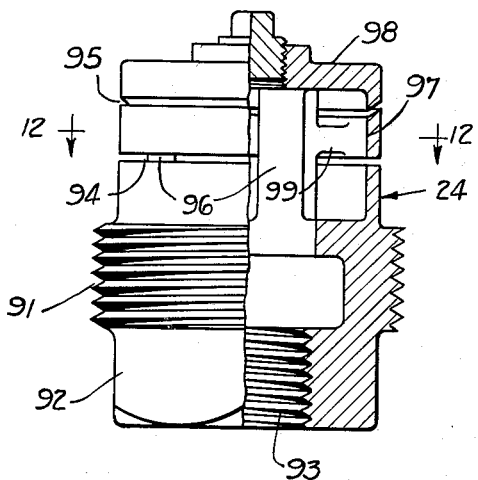
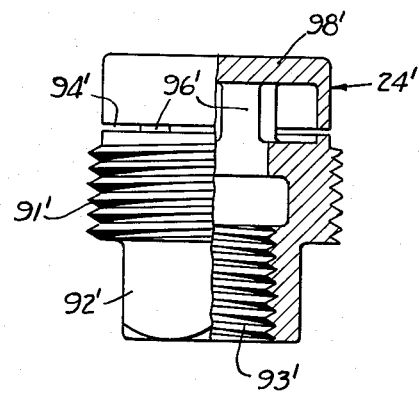
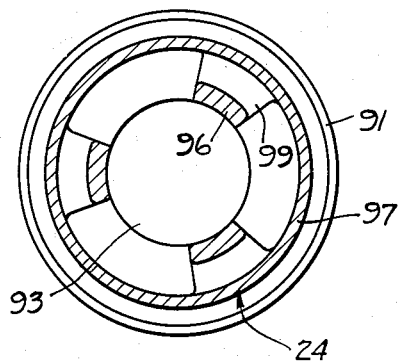
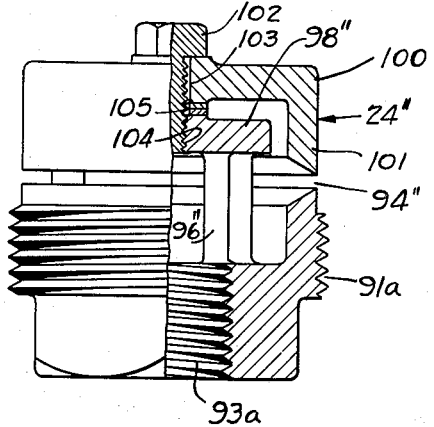
Inventor
Chester T. McGill
Atty April 17, 1956  C. T. McGILL  2,742,421
WATER CONDITIONING APPARATUS
Filed May 17, 1950  5 Sheets-Sheet 5
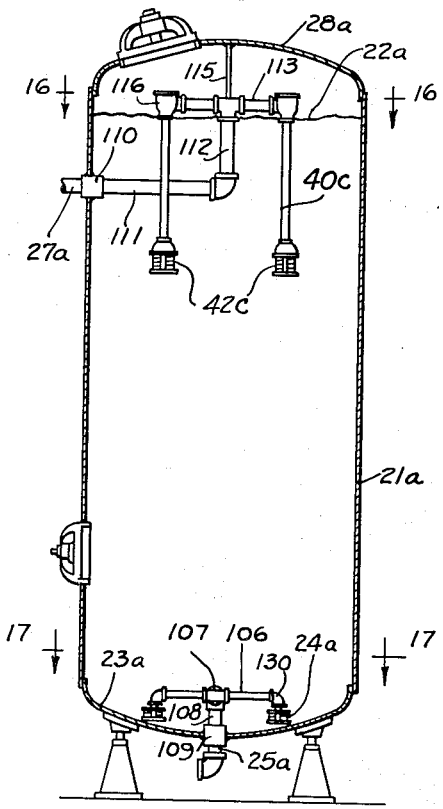
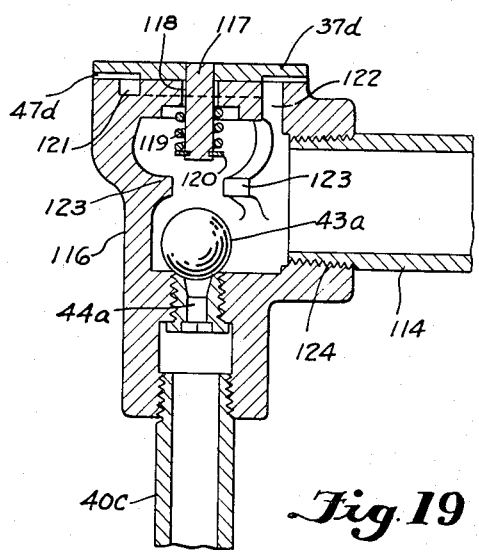
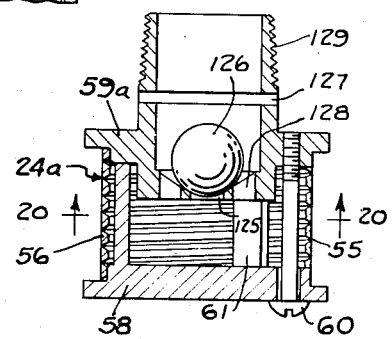
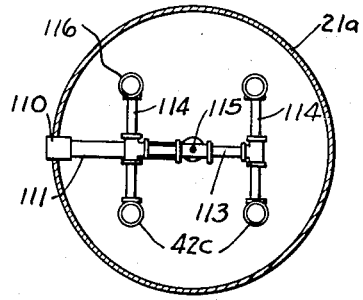
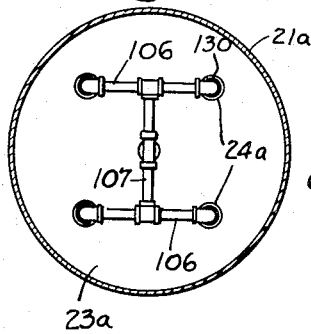
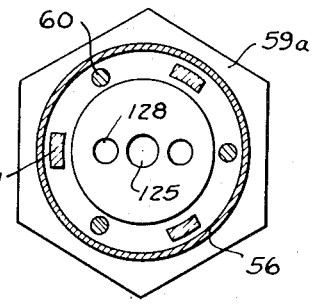
Inventor
Chester T. McGill
Atty United States Patent Office 2,742,421
Patented Apr. 17, 1956

2,742,421

WATER CONDITIONING APPARATUS

Chester T. McGill, Elgin, Ill., assignor to Elgin Softener Corporation, Elgin, Ill., a corporation of Illinois Application May 17, 1950, Serial No. 162,483

11 Claims. (Cl. 210—24)

This invention relates to liquid conditioning apparatus, such as water softeners and filters, and is more particularly concerned with improvements in flow control and strainer apparatus.

An important feature of the present invention is that the liquid distributing strainer means is so designed that the usual bed of gravel for support of the zeolite or other liquid conditioning material is no longer required, the distributing strainer means being arranged in backwashing to discharge the water under the zeolite so as to lift it off the bottom of the tank and thoroughly agitate and clean it and thus keep it in a more efficiently operating condition.

One important object of the invention is to provide flow control and strainer means so designed that in the regular operation of an upflow base exchange water softener, or in the upwashing for cleansing purposes of a downflow filter or a downflow base exchange water softener, the flow of water to the service or to the backwashing drain will not be apt to cause any of the material of the bed to be carried to waste, that is, to the service system or to the drain, although particles of dirt and other contamination are efficiently segregated and carried to the drain during the backwashing period.

A novel feature of the improved flow control and strainer means of my invention is the provision for discharge of water from the softener to service or waste from several different levels within the softener.

Another novel feature of my invention is the provision for inlet of water to the softener at one or more levels in the service operation and in the brining and rinsing operations.

A further novel feature of the invention is the provision of flow control and strainer apparatus for use in the top portion of softener and filter tanks, so designed and constructed that outlets having a predetermined restriction are provided at different levels, but these same outlets are adapted automatically to open up upon reversal of flow to form relatively unrestricted inlets.

Still another novel feature of the invention is the provision of strainer means providing restricted water outlets at different levels in the top portion of a softener or filter tank, wherein these outlets are of a diameter or diameters bearing a predetermined relationship to the larger diameter of the tank concentrically arranged relative thereto, so that the collection or congregation of material particles around the lower one of these outlets results in the formation of a circular mat of the zeolite or other granular material of the bed in the tank which constitutes an appreciable obstruction to upward flow of water and accordingly causes an increase in the rate of flow around this mass thereby insuring a better cleansing or scouring action on the dirtier material in the top portion of the bed, without, however, giving rise to the danger of fine material being washed out, inasmuch as the rate of flow drops again immediately above the restricted area where the flow is distributed substantially to the full diameter of the tank, the dirt washed from the material being carried out with the water discharged through the upper outlet or outlets.

The invention embodies other objects and advantages all of which will appear in the course of the following detailed description, taken in connection with the accompanying drawings, in which—

Fig. 1 is a more or less diagrammatic vertical section through a water softener embodying improved flow control and strainer apparatus made in accordance with my invention;

Fig. 2 is a view partly in elevation and partly in vertical section through the top portion of the softener of Fig. 1, on a larger scale;

Fig. 3 is a top view of Fig. 2;

Fig. 4 is a vertical section through the top strainer illustrated in Fig. 1, on a larger scale;

Fig. 5 is a further enlarged sectional detail of the wall of the strainer illustrated in Fig. 4;

Fig. 6 is a view similar to Fig. 2 but showing a modified or alternative construction;

Fig. 7 is a top view of Fig. 6 with the cap removed;

Fig. 8 is a view partly in elevation and partly in vertical section of a flow control and strainer device of modified or alternative construction adapted for use in the top portion of a softener in place of the device shown in the upper portion of the softener in Fig. 1;

Fig. 9 is a vertical section along the lines of Fig. 6 but showing another modified or alternative construction of a flow control and strainer device somewhat similar to that of Fig. 8;

Fig. 10 is a view partly in elevation and partly in vertical section similar to a portion of Fig. 6 but showing another modified or alternative construction;

Fig. 11 is a view partly in elevation and partly in vertical section of the bottom distributor and strainer nozzle shown in Fig. 1, on a larger scale;

Fig. 12 is a cross section on the line 12—12 of Fig. 11;

Figs. 13 and 14 are views partly in elevation and partly in vertical section showing other bottom distributor and strainer nozzles similar to Fig. 11;

Fig. 15 is a view similar to Fig. 1 but showing a softener embodying flow control and strainer apparatus of a modified or alternative design;

Figs. 16 and 17 are cross sections taken on the correspondingly numbered lines of Fig. 15 showing top views of the upper and lower distributor manifolds;

Fig. 18 is an enlarged vertical sectional detail through a portion of the upper distributor manifold shown in Fig. 15;

Fig. 19 is a view similar to Fig. 4 showing one of the strainers used on the lower manifold of Fig. 15, and Fig. 20 is a cross section on the line 20—20 of Fig. 19.

Similar reference numerals are applied to corresponding parts throughout these views.

Referring first to Figs. 1 to 5, the tank 21 shown in Fig. 1 is nearly filled with zeolite or other base exchange material as indicated by the bed 22, special attention being called to the fact that the bed rests directly on the dished bottom 23 of the tank, there being no layer of gravel required with the improved flow control and strainer and distributor apparatus provided in accordance with my invention. A distributor or strainer 24 is provided in the bottom of the tank connected by means of a pipe 25 with a multi-port valve 26. Another pipe 27 extends from the valve to the top 28 of the tank, the connection of the pipe 27 with the top of the tank being shown in detail in Fig. 2. A raw water pipe 29 is indicated in dotted lines in Fig. 1 as having connection with the back of the valve 26, and 30 is a soft water outlet pipe and 31 is a drainpipe also connected with the valve 26. Brine is supplied from a brine tank 32 in the usual way through a pipe 33, the brine being drawn from the bottom of the brine tank through slots in the lower end portion 34 of the pipe 33 when the multi-port valve 26 is in the salting position and the brine shut-off valve 35 is opened, as well known in the art.

When the softener is in service, raw water from pipe 29 passes through valve 26 and pipe 27 into the top of the softener through the fitting 36 that is entered into another fitting 36' welded in an opening in the top 28 of the tank. The water is discharged into the top of the tank past a washer, disk, or ring member 37 held yieldably in the raised position against a seat provided therefor on the bottom of fitting 36 by a coiled compression spring 38 seated against an adjustable ring or collar 39 clamped in an adjusted position on the downwardly extending pipe 40 by means of a set screw 41. The pipe 40 carries on its lower end a strainer 42, but water cannot pass downwardly through the pipe 40, because there is a ball check-valve 43 seating in the upper end of the pipe 40 above an orifice nipple 44 threaded in the upper end portion of the pipe. The water discharged into the top of the tank from fitting 36 passes downwardly through channels or passages 45 formed in the fitting, and when the water strikes the ring 37 it is distributed radially to the full diameter of the tank, and, the spring 38 being fairly weak, the washer 37, which has a shoulder portion 46 to define a slot 47 of a predetermined width between the washer 37 and the bottom of the fitting 36, will move downwardly against the action of the spring and thus increase the area of the slot 47. The fitting 36 may be secured in the fitting 36' in any suitable or preferred manner, although I have shown downwardly extending lugs 48 on opposite sides of the flanged top portion 49 of fitting 36 on which cam-shaped ears are provided arranged to be locked frictionally on cam-shaped projections 51 provided on diametrically opposite ends of the top portion of fitting 36', the fitting 36 being arranged to be turned to interlock the portions 50 and 51 and to compress a gasket 52 that is interposed between top portions of the fittings. Another gasket 53 is entered between lower portions of the fittings to seal the joint and insure all incoming water from pipe 27 having to pass through the radial ports 54 into the fitting 36 and flow downwardly through channels 45. The water flowing downwardly through bed 22 is softened and leaves the tank 21 through strainer 24, pipe 25 and valve 26 and is delivered to the service system through pipe 30.

When the valve 26 is in the salting position, first the brine and then later the rinse water is discharged into the top of the softener tank in a similar manner as the raw water in softening, the spent brine leaving the bottom of the softener tank being conducted through pipe 25 and the valve 26 through pipe 31 to the drain. Of course, as soon as a predetermined amount of brine has been passed through the softener, valve 35 is closed and thereafter only raw water for rinsing is discharged into the top of the tank with the valve 26 left in the salting position, and the rinse water leaving the bottom of tank 21 is therefore also conducted to the drain through pipe 31. However, when the softener is to be backwashed preparatory to salting, valve 26 is shifted from service position to backwash position and raw water from pipe 29 is then discharged into the bottom of the tank 21 from pipe 25 through the distributor and strainer 24, which is designed, as will soon appear, to discharge the water radially in all directions directly over the inside surface of the dished bottom 23 of the tank so as to raise the entire bed and thoroughly break it up and agitate it so that the loosened material expands nearly to the full height of the tank. A certain amount of the wash water flows out through the strainer 42 and the rest goes out through the slot 47, the proportioning being determined partly by the size of the orifice 44 and partly by the weight of the ball 43, the wash water leaving the top of the tank being conducted through pipe 27 and valve 26 to the drain through pipe 31. Due to the restricted flow through orifice 44 and the added resistance to flow afforded by ball 43, the top level of the bed 22 in tank 21 rises considerably above the level of strainer 42 and, therefore, a predetermined percentage of the wash water will be caused to escape through slot 47. Although the bed 22 is loosened up and expanded by the upward flow of water, it has been definitely established by numerous tests in transparent tanks that a fairly distinct top surface is maintained on the bed regardless of changes in the backwash flow rate, the level of this top surface being dependent to a considerable extent upon the relationship established between the volume of water escaping through strainer 42 and the volume escaping through slot 47. The washer 37 during upward flow is, of course, held seated by spring 38 so that there is a predetermined restriction of slot 47 annularly with respect to the bottom of fitting 36. This slot 47 is, however, of much less area than the slot 55 defined between the convolutions 56 of the helical spring forming the body of the strainer 42. The width of the slot 55 is preferably the same as the width of the slot 47, and the slot 55 preferably has an inwardly flaring form as clearly appears in Fig. 5 so as to reduce tendency to clog. The spring 56 is caged between annular shoulders 57 on plate 58 and 59 which are secured together by means of screws 60, one of the two plates 58 and 59 having spacing projections 61 provided thereon in circumferentially spaced relation for abutment with the other plate so that screws 60 may be tightened without causing more than a predetermined restriction of the helical slot 55. Assuming, for instance, that the area of the opening in orifice 44 and the area of the circular slot 47 are equal, the total area of the helical slot 55 in the strainer 42 is considerably greater than the area of opening in orifice 44, so that even if the helical slot 55 got clogged to an appreciable extent by particles of granular material from the bed 22 adhering to the strainer, the flow rate through the strainer would still be determined by the size of the opening in orifice 44, insofar as the outlet of water from the top portion of the expanded bed through the strainer 42 is concerned, and, when the bed expands approximately to the level of the line a—b indicated in Fig. 1, some particles of the granular bed material are carried in the stream of water discharging through slot 47. In a transparent tank, when the operation is studied, these particles appear to jump one after another from the raised top surface of the bed toward the slot 47. If these particles are small enough, they will, of course, be carried out with the waste water to the drain, but if they are larger and cannot pass through the slot 47, they lodge there and gradually reduce the free slot area, thereby reducing the flow through the slot and increasing the flow through the strainer 42. This automatically causes a lowering of the bed surface to a level slightly below the line a—b, where it is then maintained until the end of the backwash. Thus, it is evident that loss of granular material from the bed to the drain is prevented, or at least reduced to a minimum, and yet the backwash flow rate is kept high enough to thoroughly expand the bed and cleanse it by the fast flow through it. I have found that even rather appreciable increases in the flow rate during backwash do not affect this result.

Figs. 6 and 7 show a modified or alternative construction that may be used instead of that shown in Figs. 2 and 3. The fitting 36a corresponds to the fitting 36' of Fig. 2, the same being welded in an opening of the top wall 28' of the tank 21'. However, in this case the fitting 36a has diametrically opposed internal ribs 62 which, together with an annular shoulder 63, define an annular groove 64 inside the fitting. The inner fitting 36b, which corresponds with fitting 36 of Fig. 2, has two external ribs 65 in diametrically opposed relation, of less length than the distance between the ribs 62 and located on a lower level than ribs 62 when fitting 36b is disposed inside fitting 36a. Two lugs 66 extend upwardly from ribs 65 to a level above the bottom of ribs 62 to limit rotation of fitting 36b inside fitting 36a so that the cap 67 which has a threaded extension 68 threading in a center hole 69 in the top of fitting 36b can be tightened. A gasket 70 interposed between the fitting 36a and cap 67 will be compressed in the tightening of the cap to seal the joint. Another gasket ring 71 is compressed between the lower portions of the fittings to seal that joint, and incoming and outgoing water passes through the circumferentially spaced holes 54' in the inner fitting and through channels 45' provided in said inner fitting. The pipe 40 of the other construction disclosed in Fig. 2 is replaced by a short nipple 40' on which an annular shoulder 39' is provided to form a support for the spring 38' that holds the shouldered washer 37' in place. The nipple 40' has a longitudinal bore 72 the upper end of which is enlarged as indicated at 73 to provide a seat for the ball 43'. The orifice 44' located above the ball 43' serves both to define the orifice opening and as an abutment for the spring 74 holding the ball 43' normally seated. In many cases the spring 43' is unnecessary, the weight of the ball itself being enough to check the flow. The lower end of the bore 72 is covered by a strainer 42'.

In assembling this construction, fitting 36b is lowered into fitting 36a so that ribs 65 pass downwardly between ribs 62 and come to rest on shoulder 63. This can be done with cap 67 removed or with it screwed part way into fitting 36b. In the latter case, as soon as the cap 67 is turned to screw the extension 68 farther into fitting 36b, the latter will turn with the cap 67 thereby bringing ribs 65 under ribs 62 and finally lugs 66 will engage the ends of ribs 62. Further turning of cap 67 causes the tops of ribs 65 to engage the bottom of ribs 62 and then in the further tightening of cap 67 gasket 70 is compressed between cap 67 and fitting 36a. The operation of this construction is similar to that previously described, only the backwash phase being affected. Here the flow is through the slot 47' and when this slot gets stopped up by accumulation of granular bed material to the extent of causing a predetermined pressure increase within the tank, the increased pressure overcomes the resistance of spring 74, or, if no spring is used and the weight of the ball 43' is relied upon alone, the ball is caused to unseat and permit upward flow through the bore 72.

Another variation in the construction is disclosed in Fig. 8 wherein a short pipe 40a is used in lieu of pipe 40 of Fig. 2 and provided at its lower end with a hollow fitting 75 having a flat bottom 76 adapted to cooperate with a spring pressed washer 77 to define an annular slot 78 for a strainer action comparable to that obtained at 47 in Fig. 2 and 47' in Fig. 6, the washer 77 being carried on a pin 79 working in a guide 80 provided in the lower end of fitting 75 and having a spring 81 surrounding the upwardly projecting end portion thereof inside fitting 75 and suitably caged between the guide 80 and a washer 82 fixed on the upper end of the pin. An apertured plug 36c, which is threaded as shown at 84 into the lower end of a fitting entered in the top wall of the tank 21 or 21', like fittings 36' and 36a, affords the strainer slot 47a between its flat lower end and the spring pressed shouldered washer 37a that is held in place by a coiled compression spring 38a seated on a ring 39a that may be clamped adjustably to pipe 40a by means of a setscrew 41a. By varying the ratio between slots 47a and 78, by change in diameter or width, or both, the proportion of water flowing through the two slots may be varied. In backwashing, when the bed rises toward, and gradually gets above the level of slot 78, this slot will become partially closed by granular bed material and thus cause a more rapid rise of the bed level, until the slot 47a also becomes partially closed by accumulation of granular bed material around it, whereupon the proportion predetermined between the two flows is approximately restored.

In the variation shown in Fig. 10 the part 36d should be taken as corresponding to the inner fitting threaded or otherwise suitably secured in the fitting (like fitting 36' of Fig. 2 or fitting 36a of Fig. 6) mounted in the opening in the top wall of tank 21 or 21', the fitting 36d in this form serving only as a guide and support for the spring 38b, there being a stud 85 threaded in the lower end of the fitting 36d having an annular shoulder 86 on its lower end forming a seat for the spring and the spring serving to hold the shouldered washer 37b in place to define the strainer slot 47b. On the other hand, the part 36d may be taken as being the lower portion of fitting 75 in Fig. 8, it being obvious that the spring pressed washer 77 may be held in place from below in the manner shown in Fig. 10.

The variation in construction shown in Fig. 9 is most closely similar to that shown in Fig. 8. In this instance, the pipe 40b is threaded at its upper end in the lower end of a fitting 36e which fits inside another fitting 36f that is welded or otherwise suitably secured in an opening in the top wall 28" of the tank 21 or 21'. The fitting 36e has an enlarged upper end portion 87 overlying the top of fitting 36f, and gaskets 88 are arranged to be compressed between the fittings when a hand screw 89 is tightened, the latter being threaded in the upper end of an inverted U-shaped yoke 90 of the kind commonly used on the tops of water softener tanks for hold-down purposes. The pipe 40b in this construction has a hollow fitting 75' threaded on its lower end, the top of which is flat and cooperates with a shouldered washer 77' to define therebetween an annular slot 78' corresponding to slot 78 in Fig. 8. A coiled compression spring 81' surrounding pipe 40b bears against washer 77' to hold it seated and the upper end of this spring abuts a collar 39b that may be adjusted up or down on the pipe and held in an adjusted position by a setscrew 41b. Another annular slot 47c is defined between the flat bottom of fitting 36e and a shouldered washer 37c that is held in place by a coiled compression spring 38c surrounding pipe 40b and resting at its lower end on collar 39b. With this construction the pressure of the springs 38c or 81' may be adjusted as desired. In service or in brining, the water enters from the supply pipe 27 at the top and flows through channels 45' and is discharged into the tank through slot 47c, the washer 37c moving downwardly against resistance of spring 38c. At the same time, water flows downwardly through pipe 40b and is discharged through slot 78', the washer 77' being forced upwardly against the action of spring 81'. In backwashing, however, both of the washers 37c and 77' will remain seated under spring pressure, and the bed is raised by the backwash flow of water similarly as described above in regard to Fig. 1. Slots 78' and 47c are both large enough to allow sediment to pass through, but not large enough to let the granular bed material pass through. Therefore, in the upflow of water during backwashing, sediment is washed out through both of the slots 78' and 47c, and when some of the granular bed material collects around the lower slot 78', thereby restricting the flow through that slot and proportionally increasing the flow upwardly to slot 47c, the top level of the bed is accordingly raised to some extent. The building up of granular bed material around the slot 78' in a circular form results in the information of a sufficient obstruction to upward flow, when the mat of material is built up to a diameter of, say, 6 or 7 inches around the fitting 75', so that the effective area of the tank annularly of this mat is reduced appreciably and causes an appreciable increase in the rate of upward flow, inasmuch as the same amount of backwash water must pass through the restricted area, and accordingly a much better job of cleaning in the upper and dirtier portion of the bed is obtained. The velocity of flow of the water after passing the mat around slot 78' drops again because the water flow is again through the full area of the tank at this higher level, and consequently there is not too much tendency for granular bed material to collect around slot 47c. The top level of the bed will, however, rise to about the vicinity of the collar 39b and sometimes a little higher and remain there throughout the balance of the backwash period, unless a sudden surge occurs in which case any granular bed material that is carried up to a point high enough to reach the slot 47c will collect around the slot and restrict the flow and cause the level of the bed to drop back down to a point somewhere between the washer 77' and collar 39b. As soon as the multiport valve is turned from the backwash position to the salt wash or brining position, whatever bed material collected around either of the slots 78' and 47c is released and is immediately returned to the top of the bed. This construction has the advantage over that disclosed in Fig. 1 that the collected granular material at slot 78' is certain to be cleared off as soon as the multiport valve is turned to the brining position or the service position. Furthermore, with this construction the fitting 75' can be located above or below the top of the bed, whereas with the strainer 42 shown in Fig. 1, it must be located below the top of the bed for best performance. The present construction is furthermore less expensive to manufacture and it requires less head space between the top of the softener and the ceiling which is an advantage in many basements where the softener may be located where there is not enough head room above it to permit removal of the top strainer assembly when designed along the lines of Fig. 1.

Fig. 11 illustrates the bottom strainer 24 shown in Fig. 1, the same being in the form of a one-piece cast fitting that is of enlarged cylindrical form intermediate its ends and threaded as indicated at 91 for entry like a plug in the center hole in the bottom of the tank, the lower end portion 92 being of hexagonal form for application of the wrench and having an internally threaded hole 93 therein for connection with the pipe 25. An annular slot 94 is provided in the upper cylindrical portion of the fitting in a horizontal plane, and above it is another annular slot 95 which is inclined upwardly and outwardly at approximately 45°, the thought being to have the water issuing from the lower slot 94 enters between the bottom of the bed and the bottom of the tank to raise the bed, and to have the water issuing from slot 95 directed upwardly and outwardly to better insure lifting the bed. Three equally circumferentially spaced columns 96 extend upwardly from the middle portion 91 of the fitting to support the ring 97 and top wall 98 between which the slot 95 is formed, ring 97 being spaced radially from the columns 96 and connected thereto by radial webs 99, so that the full circumference of slots 94 and 95 is exposed for unimpeded discharge of water.

One of the slots 94 and 95 may be dispensed with as illustrated in the modified form 24' shown in Fig. 13, this fitting having only the horizontal slot 94' but being otherwise similar in construction.

In the further modification shown in Fig. 14, the fitting 24" has the diameter of the top wall 98" reduced so that a cap 100 can be assembled over it with its depending annular flange 101 extending downwardly around the wall 98" to define the top of the annular slot 94". This cap is secured to the main body of the strainer 24 by means of a screw 102 which is entered through a center hole 103 in the cap 100 and threaded in the center hole 104 in the wall 98", spacer washers or shims 105 being inserted between the cap 100 and wall 98" to determine the width of the slot 94", as desired.

Where the diameter of the softener tank 21 or 21' is large enough to necessitate the use of more than one strainer the design illustrated in Figs. 15 to 18 may be used. In this embodiment the bottom strainers 24a are mounted on laterally extending pipes 106 connected with a header 107 which in turn communicates through a pipe 108 with a nipple 109 that is welded or otherwise suitably secured in a center opening in the bottom wall 23a of the tank 21a. The bottom pipe 25a is connected to the bottom of the tank in the nipple 109. The strainers 24a may be set radially relative to the spherical surface of the bottom wall 23a of the tank 21a. The top pipe 27a threads into a nipple 110 that is welded or otherwise suitably secured in an opening in the side wall of the tank 21a near the top. Another pipe 111 extends inwardly from the nipple 110 and is connected with an upwardly extending pipe 112 in the center of the top portion of the tank. This pipe carries a manifold 113 with laterally extending pipes 114 on the ends of which the pipes 40c carrying the strainers 42c are carried. The manifold 113 is preferably braced by means of a rod 115 extending from the manifold upwardly to the top wall 23a to which it is preferably welded, or otherwise suitably secured. The elbow fitting 116 connecting the laterally extending pipes 114 with the depending pipes 40c contain the orifice nipples 44a and the ball check valves 43a. On top of each fitting 116 is carried a shouldered washer 37d which cooperates with the flat top surface of the fitting to define the annular slot 47d. The washer has a downwardly extending stem 117 which works in a guide 118 and has a coiled compression spring 119 caged on its lower end portion between the guide 118 and a washer 120, tending to hold the washer 37d seated. A ring shaped groove 121 in the upper portion of the fitting communicates with the inside of the fitting through one or more channels 122. The radial projections 123 inside the fitting above the ball check valve 43a are so located that the ball can be entered through the side opening 124 before the pipe 114 is threaded in place, but the pipe thereafter retains the ball in place by cooperation with the nearby projections 123.

The bottom strainers 24a carried on the laterals 106 are constructed along the lines shown in Figs. 19 and 20. The construction is similar to that of strainer 42 shown in Fig. 4 and corresponding parts have been similarly numbered. The top member 59a in the strainer 42c has a central opening 125 which serves as a seat for a ball check valve 126. The latter is kept caged in the member 59a by a crosspin 127 provided in upwardly spaced relation to the ball as shown. Around the center hole 125 are other holes 128 in circumferentially spaced relation, so that a lower rate of flow in one direction is permitted with the ball 126 seated, and a higher rate of flow is permitted in the opposite direction when the ball 126 is unseated. The member 59a has a threaded neck portion 129 for screwing into the elbow 130 provided on the ends of the laterals 106.

The operation of the softener shown in Figs. 15 to 20 will be readily understood by reference to the description of the operation of the softener shown in Figs. 1 to 5, that is, if the balls 126 are considered as omitted from the bottom strainers 24a, inasmuch as there is no check valve in the strainer 24. The check valve 126 serves to restrict the flow in one direction, and it should be obvious that by changing the ratio between the area of the central opening 125 in relation to the combined area of the holes 128, the relationship of the flows in the opposite directions may be predetermined as desired.

It is believed the foregoing description conveys a good understanding of the objects and advantages of my invention. The appended claims have been drawn to cover all legitimate modifications and adaptations.

I claim:

1. In a liquid conditioning apparatus comprising an upright tank containing a bed made up of small particles of liquid conditioning material with a predetermined freeboard space left thereabove, and conduit means connecting the upper and lower ends of said tank with a source of liquid, to drain, and to a point of use, the improvement which consists in the provision of liquid distributing and collecting means in the upper part of said tank comprising a strainer device suspended on a substantially vertical pipe substantially centrally in the upper portion of said tank so that the strainer is substantially at the normal level of the top of said bed, the upper end of said pipe being connected with a fitting carried in an opening provided in the top of said tank, said fitting communicating with the aforesaid conduit means, said strainer being of enlarged radius in relation to said pipe and having restricted flow passages permitting flow of liquid therethrough outwardly from said tank while retaining conditioning material in said tank, said fitting providing a seat on the bottom thereof annularly relative to the upper end of said pipe with large passages opening thereto for relatively unrestricted liquid flow from said conduit means into the upper portion of said tank, and a ring member surrounding said pipe and guided thereby for up and down movement toward and away from said seat and normally urged by spring means toward said seat to a position defining between said seat and the radially outer portion of said ring member a continuous restricted orifice of enlarged radius in relation to said pipe all around said ring member and substantially concentric with the outer tank wall permitting restricted outflow of liquid from said tank into said conduit means while retaining conditioning material in the tank, said ring member being movable against spring pressure away from said seat in response to inflow of liquid into the tank at which time the ring member serves as a baffle to distribute the inflowing liquid radially outwardly toward the outer tank wall.

2. Liquid conditioning apparatus as set forth in claim 1 including a flow restricting orifice nipple provided in said pipe to restrict the outflow of liquid through said strainer and pipe in a predetermined ratio to the restriction of outflow afforded by said ring member.

3. Liquid conditioning apparatus as set forth in claim 1 including means for adjusting the spring loading on said ring member urging it toward the seat.

4. Liquid conditioning apparatus as set forth in claim 1 wherein the strainer on the lower end of the pipe is of similar construction to the strainer defined by the ring member, the orifice for the strainer on the lower end of the pipe having the same kind of orifice as the other strainer but of a different restriction, whereby to proportion the outflow of liquid from the tank accordingly between the two strainers.

5. Liquid conditioning apparatus as set forth in claim 1 including a check valve preventing downflow through the vertical pipe but permitting upflow therethrough.

6. Liquid conditioning apparatus as set forth in claim 1 including a check valve preventing downflow through the vertical pipe but permitting upflow therethrough, the check valve being of a predetermined weight to proportion the outflow of liquid from said tank so that a certain portion flows out through the strainer and the rest through the restricted orifice defined by the ring member.

7. Liquid conditioning apparatus as set forth in claim 1 including a check valve preventing downflow through the vertical pipe but permitting upflow therethrough, and spring means holding said check valve normally seated, said check valve being openable against the action of said spring means in response to a predetermined pressure differential on opposite sides of said check valve.

8. In a liquid conditioning apparatus comprising a tank containing a bed made up of small particles of liquid conditioning material with a predetermined freeboard space left thereabove, and conduit means connecting the top and bottom portions of said tank with a source of liquid, to drain, and to a point of use, the improvement which consists in the provision of liquid distributing and collecting means in the upper part of said tank comprising a strainer device suspended on a substantially vertical pipe in the upper portion of the tank, the upper end of said pipe being connected with a fitting supported in said tank and communicating with the aforesaid conduit means, said strainer being of enlarged radius in relation to said pipe and having restricted flow passages permitting flow of liquid therethrough outwardly from said tank, while retaining conditioning material in said tank, said fitting providing a seat thereon and having large passages provided therein opening thereto for relatively unrestricted liquid flow from said conduit means into the upper portion of said tank, and a flow restricting disk guided for axial movement toward and away from engagement with said seat and normally urged toward said seat to a position defining between said seat and the radially outer portion of said disk a substantially continuous restricted orifice substantially all around said disk, said disk being movable away from said seat in response to flow through said passages against the disk at which time the disk serves as a baffle to distribute the flow radially outwardly from the disk, said restricted orifice permitting restricted outflow of liquid from said tank into said conduit means while retaining conditioning material in the tank.

9. Liquid conditioning apparatus as set forth in claim 8 including a check valve preventing downflow through the vertical pipe but permitting upflow therethrough.

10. Liquid conditioning apparatus as set forth in claim 8 including a check valve preventing downflow through the vertical pipe but permitting upflow therethrough, the check valve being of a predetermined weight to proportion the outflow of liquid from said tank so that a certain portion flows out through the strainer and the rest through the unrestricted orifice defined by the disk.

11. Liquid conditioning apparatus as set forth in claim 8 wherein the strainer on the lower end of the pipe is of similar construction to the strainer defined by the disk member, the orifice for the strainer on the lower end of the pipe having the same kind of orifice as the other strainer but of a different restriction, whereby to proportion the outflow of liquid from the tank accordingly between the two strainers.

References Cited in the file of this patent
UNITED STATES PATENTS

| | | |
|---|---|---|
| 1,689,308 | Stickney | Oct. 30, 1928 |
| 1,692,592 | Stickney | Nov. 20, 1928 |
| 1,694,804 | Turner | Dec. 11, 1928 |
| 1,718,767 | Wade | June 25, 1929 |
| 1,763,783 | Hodkinson | June 17, 1930 |
| 1,781,874 | Hopkins | Nov. 18, 1930 |
| 1,873,594 | Johnson | Aug. 23, 1932 |
| 1,903,611 | Dotterweich | Apr. 11, 1933 |
| 1,905,021 | Wagner | Apr. 25, 1933 |
| 1,951,917 | Leslie | Mar. 20, 1934 |
| 1,962,663 | McGill | June 12, 1934 |
| 1,985,162 | Gillis | Dec. 18, 1934 |
| 2,042,008 | Kenney | May 26, 1936 |
| 2,050,966 | Eisenhauer | Aug. 11, 1936 |
| 2,304,109 | McGill | Dec. 8, 1942 |
| 2,435,975 | McGill | Feb. 17, 1948 |
| 2,570,258 | McGill et al. | Oct. 9, 1951 |

FOREIGN PATENTS

| | | |
|---|---|---|
| 6,707 | Australia | Apr. 2, 1928 |